US010295996B2

(12) United States Patent
Yoshida et al.

(10) Patent No.: US 10,295,996 B2
(45) Date of Patent: May 21, 2019

(54) TEST DEVICE FOR MONITORING CONTROL DEVICE

(71) Applicant: Mitsubishi Electric Corporation, Chiyoda-ku, Tokyo (JP)

(72) Inventors: Keigo Yoshida, Tokyo (JP); Mitsunobu Yoshinaga, Tokyo (JP); Shinichiro Tsudaka, Tokyo (JP)

(73) Assignee: MITSUBISHI ELECTRIC CORPORATION, Chiyoda-Ku, Tokyo (JP)

( * ) Notice: Subject to any disclaimer, the term of this patent is extended or adjusted under 35 U.S.C. 154(b) by 290 days.

(21) Appl. No.: 15/504,228

(22) PCT Filed: Oct. 8, 2014

(86) PCT No.: PCT/JP2014/076921
§ 371 (c)(1),
(2) Date: Feb. 15, 2017

(87) PCT Pub. No.: WO2016/056080
PCT Pub. Date: Apr. 14, 2016

(65) Prior Publication Data
US 2017/0277175 A1    Sep. 28, 2017

(51) Int. Cl.
G05B 23/02        (2006.01)

(52) U.S. Cl.
CPC ......... G05B 23/0243 (2013.01); G05B 23/02 (2013.01)

(58) Field of Classification Search
CPC .............................. G05B 23/02; G05B 23/0243
See application file for complete search history.

(56) References Cited

U.S. PATENT DOCUMENTS 6,725,435 B2 *   4/2004   Cote ................... G06F 17/5022
                                                  716/106
6,941,243 B1 *   9/2005   Maciona ............... G06F 11/263
                                                  702/117
(Continued)

FOREIGN PATENT DOCUMENTS

JP        9-114689 A      5/1997
JP        2001-175318 A   6/2001
JP        2014-157444 A   8/2014

OTHER PUBLICATIONS

International Search Report (PCT/ISA/210) dated Jan. 6, 2015, by the Japanese Patent Office as the International Searching Authority for International Application No. PCT/JP2014/076921.
(Continued)

*Primary Examiner* — M. N. Von Buhr
(74) *Attorney, Agent, or Firm* — Buchanan Ingersoll & Rooney PC

(57)    ABSTRACT

This test device for a monitoring control device includes an input/output controller, a logic controller, a logic connector, a logic executing simulator, a test target indication unit, an apparatus characteristic receiver, a logic managing simulator, and a logic connection information generator. Using an apparatus characteristic obtained by the apparatus characteristic receiver, the logic managing simulator specifies a simulation logic appropriate for a control logic on the basis of a simulation logic management rule. The logic connector connects the control logic and the simulation logic, by using logic connection information generated on the basis of a logic connection rule.

4 Claims, 15 Drawing Sheets

(56) References Cited

U.S. PATENT DOCUMENTS

| | | | |
|---|---|---|---|
| 7,107,488 B2 * | 9/2006 | Hashimoto | G05B 19/0428 714/25 |
| 7,915,884 B2 * | 3/2011 | Birmiwal | G01R 31/318364 324/73.1 |
| 8,332,193 B2 * | 12/2012 | McKim | G09B 9/00 703/6 |
| 2009/0112335 A1 * | 4/2009 | Mehta | G05B 13/048 700/29 |
| 2018/0210428 A1 * | 7/2018 | Jundt | H04L 67/12 |

OTHER PUBLICATIONS

Written Opinion (PCT/ISA/237) dated Jan. 6, 2015, by the Japanese Patent Office as the International Searching Authority for International Application No. PCT/JP2014/076921.

* cited by examiner

FIG. 7

| ARITHMETIC ELEMENT | | EXPLANATION |
|---|---|---|
| INPUT OPERATOR | IN SIGNAL NAME | SIGNAL INPUT FROM OUTSIDE |
| OUTPUT OPERATOR | OUT SIGNAL NAME | SIGNAL OUTPUT TO OUTSIDE |
| AND OPERATOR | AND | Outputs digital value 1 when digital value 1 is inputted for all. Otherwise, outputs digital value 0. |
| OR OPERATOR | OR | Outputs digital value 0 when digital value 0 is inputted for all. Otherwise, outputs digital value 1. |
| NOT OPERATOR | NOT | Outputs digital value 1 when digital value 0 is inputted. Outputs digital value 0 when digital value 1 is inputted. |
| FLIP-FLOP | S R | Outputs digital value 1 when digital value 1 is inputted to S. Outputs digital value 0 when digital value 1 is inputted to R. Outputs digital value 0 when digital value 1 is simultaneously inputted to S and R. |
| ON DELAY | DELAY T1 | Outputs digital value 1 after T1 time after digital value 0 is shifted to 1. |
| | | EXPLANATION |
| SIGNAL LINE | ⟶ | Digital line (takes 0 or 1) |

| V-001 LOGIC CONNECTION INFORMATION ||
|---|---|
| CONTROL LOGIC | SIMULATION LOGIC |
| V1-CL-O | CL-IN |
| V1-OP-O | OP-IN |
| V1-CLD | CL-OUT |
| V1-OPD | OP-OUT |

| V-004 LOGIC CONNECTION INFORMATION ||
|---|---|
| CONTROL LOGIC | SIMULATION LOGIC |
| V4-CL-O | CL-IN |
| V4-OP-O | OP-IN |
| V4-CLD | CL-OUT |
| V4-OPD | OP-OUT |

| SIMULATION LOGIC MANAGEMENT RULE ||
|---|---|
| APPARATUS TYPE | SIMULATION LOGIC |
| TANK | LOGIC A |
| PUMP | LOGIC B |
| VALVE (TYPE-A) | LOGIC C1 |
| VALVE (TYPE-B) | LOGIC C2 |
| ⋮ | ⋮ |

1001

| VALVE LOGIC CONNECTION RULE | |
|---|---|
| CONTROL LOGIC | SIMULATION LOGIC |
| V[0-9]-CL-O | CL-IN |
| V[0-9]-OP-O | OP-IN |
| V[0-9]-CLD | CL-OUT |
| V[0-9]-OPD | OP-OUT |

1101

| APPARATUS NAME | APPARATUS TYPE | MANUFACTURER | APPARATUS MODEL |
|---|---|---|---|
| T-001 | TANK | COMPANY A | A-001 |
| P-001 | PUMP | COMPANY B | B-001 |
| P-002 | PUMP | COMPANY B | B-001 |
| P-003 | PUMP | COMPANY B | B-001 |
| V-001 | VALVE | COMPANY C | C-001 |
| V-002 | VALVE | COMPANY C | C-001 |
| V-003 | VALVE | COMPANY C | C-001 |
| V-004 | VALVE | COMPANY C | C-002 |
| V-005 | VALVE | COMPANY C | C-002 |
| M-001 | APPARATUS X | COMPANY D | D-001 |
| M-002 | APPARATUS X | COMPANY D | D-002 |
| . | . | . | . |
| . | . | . | . |
| . | . | . | . |
| . | . | . | . |
| . | . | . | . |
| . | . | . | . |

FIG. 19

| SIMULATION LOGIC MANAGEMENT RULE | |
|---|---|
| APPARATUS TYPE | BASIC SIMULATION LOGIC |
| TANK | LOGIC A |
| PUMP | LOGIC B |
| VALVE | LOGIC C |
| APPARATUS X | LOGIC D |
| . . . | . . . |

| APPARATUS X LOGIC CONNECTION RULE | |
|---|---|
| CONTROL LOGIC | SIMULATION LOGIC |
| M[0-9]-[A-Z]-O | [A-Z]-IN |
| M[0-9]-[A-Z]D | [A-Z]-OUT |

| M-001 LOGIC CONNECTION INFORMATION | |
|---|---|
| CONTROL LOGIC | SIMULATION LOGIC |
| M1-A-O | A-IN |
| M1-AD | A-OUT |

| M-002 LOGIC CONNECTION INFORMATION | |
|---|---|
| CONTROL LOGIC | SIMULATION LOGIC |
| M2-A-O | A-IN |
| M2-AD | A-OUT |
| M2-B-O | B-IN |
| M2-BD | B-OUT |

~2201

TEST DEVICE FOR MONITORING CONTROL DEVICE

TECHNICAL FIELD

The present invention relates to a test device for a monitoring control device, the test device performing tests on the monitoring control device which controls apparatuses and the like of a monitoring control system.

BACKGROUND ART

Monitoring control, systems are systems in which information from apparatuses to be monitored such as temperature sensors, pressure sensors, position sensors, and other various types of sensors is presented to operators or monitoring persons, and in which various types of apparatuses such as motors, valves, switches, hydraulic devices are controlled through operations by operators or monitoring persons. Such monitoring control systems are used in a wide range of fields of power plant, chemical plant, power receiving/distributing facility, water and sewage, and the like.

In a typical monitoring control system, a plurality of modules are provided as divided modules so as to respectively correspond to processes such as signal transmission/reception with an apparatus that is to be the target of the monitoring control, and these are connected by communication paths, whereby various processes are realized.

The process content of each module in a monitoring control system is more and more expressed in the form of a directed graph ("directed graph" is a figure composed of vertexes and edges each having a direction (arrow)) in which input/output directions of signals are indicated by arrows, as in a circuit diagram. Specifically, the process content of each module is expressed as follows: nodes (hereinafter, also referred to as "arithmetic elements") are connected to one another, each node representing a process of a signal, and the nodes and links (hereinafter, also referred to as signal lines) each showing the flow of a signal are combined together. The process content of a module was fixedly realized by hardware circuitry in the past. However, in recent years, from the viewpoint of flexibility and cost performance, the process content is more and more implemented in the form of a program on a digital computer so that the process is realized through simulation of operation on the digital computer.

An example of a standard for a programming language for expressing process contents by use of arithmetic elements and signal lilies is International Standard IEC 61131-3. Arithmetic elements are described in a function block diagram (FBD for short) according to the International Standard, and the process contents represented by arithmetic elements and signal, lines combined together are expressed in a diagram called logic diagram.

In recent years, associated with increase in the size of programs, work of testing programs is becoming difficult to be conducted. This phenomenon is also observed in generation of a logic diagram (control logic diagram) that represents a control logic for monitoring control in a monitoring control system. Specifically, in a logic diagram, a plurality of processes that correspond to various modes are described (here, a "process" means a so-called computer process, whereas "a plurality of processes that correspond to various nodes" will toe referred to as "behavior"). Thus, the control logic tends to be complicated, and the complicated control logic is described so as to be divided into a plurality of logic diagrams. Moreover, since the number of apparatuses to be controlled is large, the number of logic diagrams for controlling the apparatuses is also huge.

In general, in a test for ensuring correctness of the behavior of the control logic, a test using a simulation (hereinafter, also referred to as "simulation logic") is performed before a test using an actual control target apparatus is performed. A simulation simulates operation that corresponds to a pump device or the like in an actual plant, for example.

An example of prior art that performs a control logic test using a simulation is the technology described in the conventional example of Patent Document 1. According to the prior art described in Patent Document 1, a test person performs an input operation of inputting various data to a man-machine input function in accordance with a test procedure manual, a result processed in a control logic is inputted via a process output function into a simulation, a result simulated in the simulation is sent to a process input function, process data is inputted to the control logic, a control result is outputted via the control logic to a man-machine output function, and then, the test person compares the content from the man-machine output function with the content of the test procedure manual, thereby determining pass or failure.

Meanwhile, in order to make such a control logic test efficient, a technique for automatizing test work has been proposed. According to the technology described in Patent Document 1, provided are: test pattern management means for managing a test pattern classified by the content of a test; prerequisite condition setting means for setting a prerequisite condition required when executing the test pattern to a plant control device; operation simulation means for simulatively applying an operation instruction for executing the test pattern to the plant control device; history storage means for storing a history of a plant state generated as a result of the plant being controlled by the plant control device; and judgment means for judging the result of the test by comparing the plant state with predetermined judgment criteria, and the control logic test is automatically performed.

CITATION LIST

Patent Document

Patent Document 1: Japanese Laid-Open Patent Publication No. 2001-175318 (Page 2 to page 4, FIG. 1, FIG. 25)

SUMMARY OF THE INVENTION

Problems to be Solved by the Invention

In Patent Document 1, automatization is limited to execution of the test, and no method for efficiently constructing a test environment is taken into consideration. When conducting a test using an actual control target apparatus, it is necessary to connect the input/output of the control logic and the input/output of the control target apparatus to each other by using signal lines and the like of hardware. Similarly, even when conducting a test using a simulation, it is necessary to specify a simulation that corresponds to each control logic, and to logically connect the input/output of the control logic and the input/output of the simulation to each other.

As described above, in the conventional method, no method is taken into consideration in which a simulation appropriate for solving the above problem is specified and the input/output of the control logic and the input/output of the simulation are connected to each other. In addition, the conventional method requires connection between the inputs/outputs of a huge number of control logics and simulations. Thus, for construction of a test environment, the work of specifying simulations appropriate for solving the above problem and connecting the specified simulations requires time and effort.

The present invention has been made in view of the problem described above. An object of the present invention is to provide a technology capable of appropriately specifying simulations corresponding to control logics so as to be able to solve the above problem, and correctly connecting the inputs/outputs of the control logics and simulations, thereby preventing failure of the test due to erroneous connection and performing the test efficiently.

Solution to the Problems

A test device for a monitoring control device according to the present invention is a test device for a monitoring control device for an apparatus that is to be a control target of a monitoring control system, the test device including: a control logic storage unit in which to store a control logic which is a logic for controlling the apparatus; a control logic executing unit for executing the control logic retrieved from the control logic storage unit; an input/output instructing unit for instructing the control logic executing unit to perform: an input operation of retrieving the control logic from the control logic storage unit and inputting the control logic to the control logic executing unit; and an output operation of outputting a result of execution in the control logic executing unit; a simulation logic supplying unit for supplying a simulation logic which is a logic for simulating operation of the apparatus; a simulation logic executing unit for retrieving the simulation logic from the simulation logic supplying unit and executing the simulation logic; a logic connecting unit for connecting the control logic and the simulation logic to each other; a test target indication unit to which an apparatus that is to be a control target of a control logic as a test target is indicated; a design book storage unit in which to store a design book, the design book being a book based on which the apparatus is used for designing the monitoring control system; an apparatus characteristic obtaining unit for obtaining, from the design book storage unit, an apparatus characteristic of the apparatus that has been indicated to the test target indication unit and that is to foe the control target of the control logic as the test target; a simulation logic managing unit for specifying, on the basis of a simulation logic management rule describing relationship between the apparatus characteristic and the simulation, logic, a simulation logic appropriate for the control logic as the test target; and a logic connection information generating unit for generating, on the basis of a logic connection rule describing a method for connecting the control logic and the simulation logic to each other, logic connection information for connecting the control logic as the test target and the simulation logic specified by the simulation logic managing unit to each other, wherein the logic connecting unit connects the control logic as the test target and the simulation logic as the control target to each other, by using the logic connection information generated by the logic connection information generating unit.

EFFECT OF THE INVENTION

According to the present invention, using an apparatus characteristic of the control target apparatus obtained by the apparatus characteristic obtaining unit, the simulation logic managing unit specifies a simulation logic appropriate for the control logic as the test target, on the basis of the simulation logic management rule describing relationship between the apparatus characteristic and the simulation logic. The logic connection information generating unit generates logic connection information for connecting the test target control logic and the simulation logic specified by the simulation logic managing unit to each other, on the basis of a logic connection rule describing the method for connecting the control logic and the simulation logic to each other. The logic connecting unit connects the test target control logic and the control target simulation logic to each other, using logic connection information generated by the logic connection information generating unit. Accordingly, the simulation logic corresponding to the control logic is appropriately specified, and the inputs/outputs of the control logic and the simulation logic are correctly connected to each other. Thus, failure of the test due to erroneous connection is prevented, and the test can be efficiently conducted.

BRIEF DESCRIPTION OF THE DRAWINGS

FIG. 7 shows description rules and explanations of arithmetic elements and a signal line.
FIG. 8 shows one example of logic connection information.
FIG. 9 shows one example of the logic connection information.
FIG. 10 shows one example of a simulation logic management rule.
FIG. 19 shows one example of a simulation logic management rule.
FIG. 20 shows one example of a logic connection rule.
FIG. 21 shows one example of logic connection information.
FIG. 22 shows one example of the logic connection information.

DESCRIPTION OF EMBODIMENTS

Embodiment 1

Figure 1:
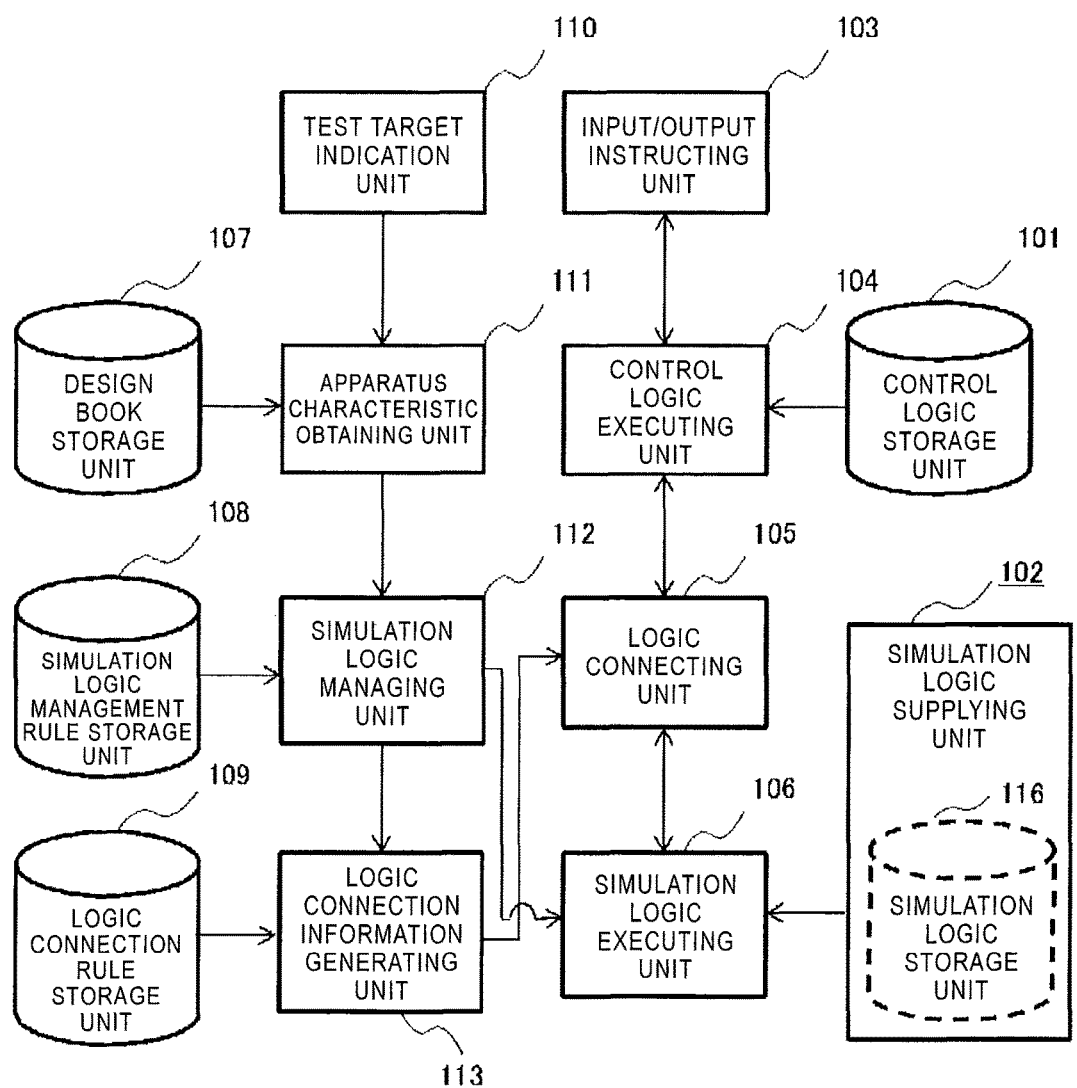
FIG. 1 is a block diagram showing a configuration of a test device for a monitoring control device according to embodiment 1.

FIG. 1 is a block diagram showing a configuration of a test device for a monitoring control device according to embodiment 1 of the present invention. In FIG. 1, the test device for a monitoring control device according to the present embodiment 1 is composed of components (from a control logic storage unit 101 to a logic connection information generating unit 113 in the order of reference characters in the drawing) described below.

In FIG. 1, the test device for a monitoring control device is composed of the control logic storage unit 101, a simulation logic supplying unit 102, an input/output instructing unit 103, a control logic executing unit 104, a logic connecting unit 105, and a simulation logic executing unit 106. The test device for a monitoring control device according to embodiment 1 of the present invention is further composed of a design book storage unit 107, a simulation logic management rule storage unit 108, a logic connection rule storage unit 109, a test target indication unit 110, an apparatus characteristic obtaining unit 111, a simulation logic managing unit 112, and the logic connection information generating unit 113.

In the test device for a monitoring control device according to the present embodiment 1, a set of control target apparatuses of control logics as the test target (in the example, the set of apparatus V-001 and apparatus V-004, for example) is inputted to the test target indication unit 110. The test target indication unit 110 outputs the set of the apparatuses to the apparatus characteristic obtaining unit 111. The apparatus characteristic obtaining unit 111 receives the set of target apparatuses from the test target indication unit 110, obtains apparatus characteristics of the target apparatuses from a design book stored in the design book storage unit 107, and outputs the apparatus characteristics to the simulation logic managing unit 112. The simulation logic managing unit 112 receives the apparatus characteristics of the target apparatuses from the apparatus characteristic obtaining unit 111, specifies appropriate simulation logics corresponding to the target apparatuses on the basis of a simulation logic management rule stored in the simulation logic management rule storage unit 108, and outputs the result to the logic connection information generating unit 113 and the simulation logic executing unit 106. The logic connection information generating unit 113 receives the simulation logics from the simulation logic managing unit 112, generates, on the basis of a logic connection rule stored in the logic connection rule storage unit 109, logic connection information, for connecting the control logics as the test target and the simulation logics as the control target of the control logics, and outputs the generated logic connection information to the logic connecting unit 105. The logic connecting unit 105 receives the logic connection information from the logic connection information generating unit 113, and connects the control logics as the test target and the simulation logics to each other. The control logic executing unit 104 executes the control logics stored in the control logic storage unit 101, the simulation logic executing unit 106 executes the simulation logics supplied from the simulation logic supplying unit 102, and a result of logic execution for which input operation from the input/output instructing unit 103 has been received is outputted from the input/output instructing unit 103, whereby control logic test is performed.

Figure 2:
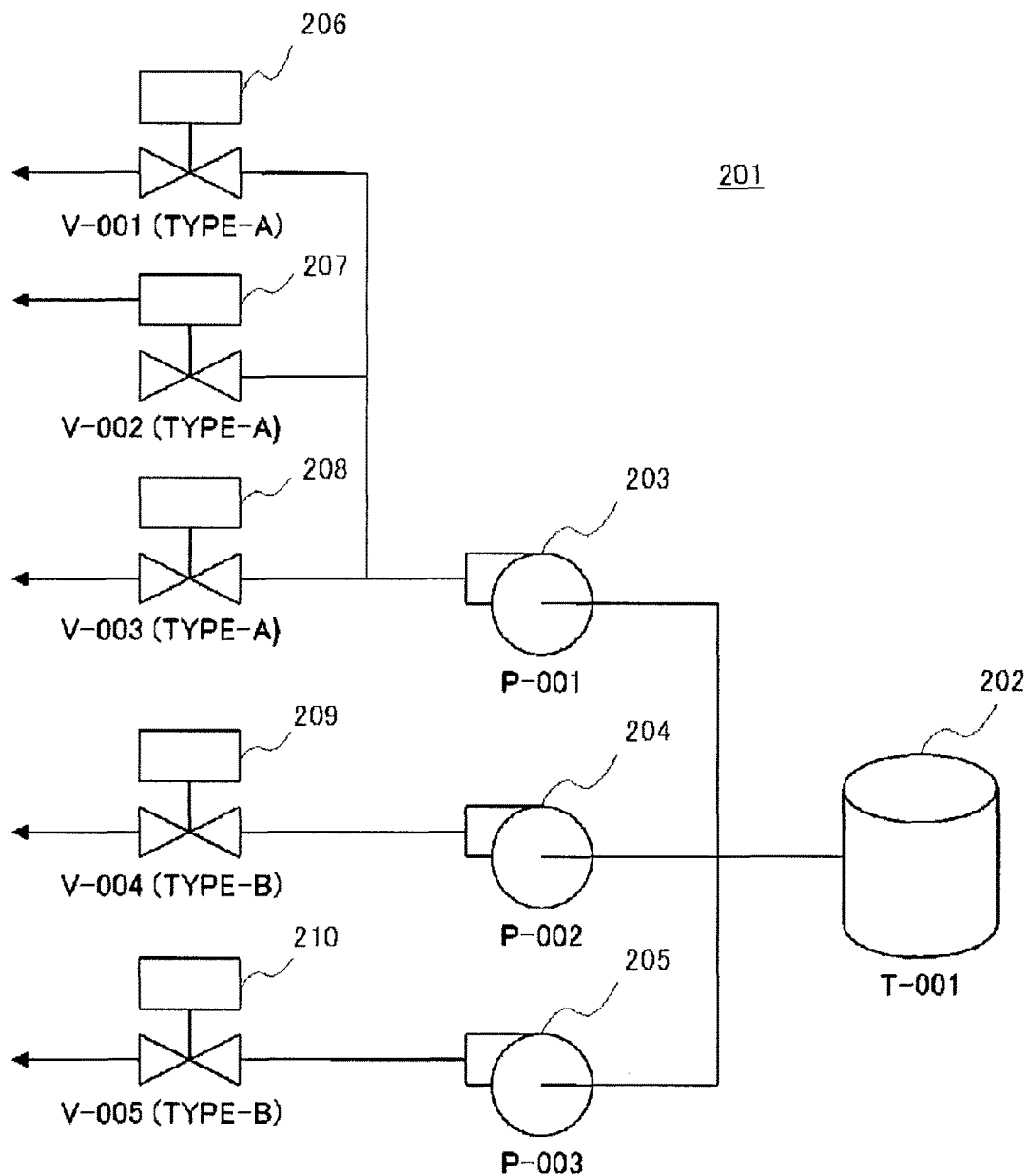
FIG. 2 shows one example of a system diagram.

FIG. 2 shows one example of a system diagram 201 stored as a design book in the design book storage unit 107. That is, the design book according to the present embodiment includes the system diagram 201 showing apparatuses that are to be the target of the monitoring control by the monitoring control system. In the example shown in FIG. 2, the system diagram 201 includes: a tank 202; three pumps 203, 204, 205; five valves 206, 207, 208, 209, 210; and pipes connecting these, which correspond to the apparatuses as the target of the monitoring control by the monitoring control system. To each apparatus, an apparatus name such as "T-001" or "P-001" unique to each apparatus, and apparatus information such as "TYPE-A" or "TYPE-B" are assigned. The pieces of apparatus information "TYPE-A" and "TYPE-B" show that the valves have different specifications, respectively, and the specifications of input signals necessary for setting the respective valves from their initial states to the open states or closed states are different, respectively.

Figure 3:
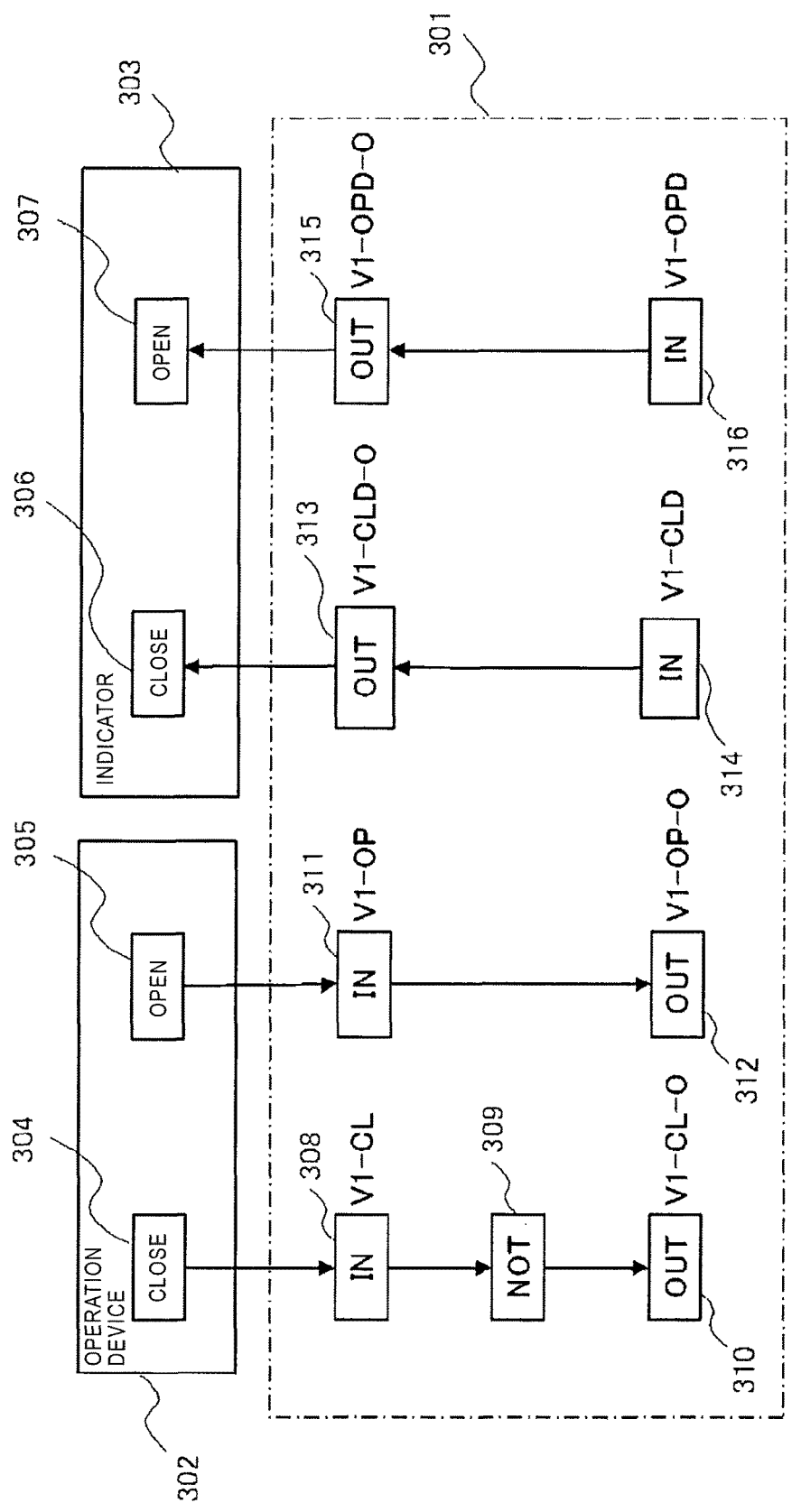
FIG. 3 shows one example of a control logic.
Figure 5:
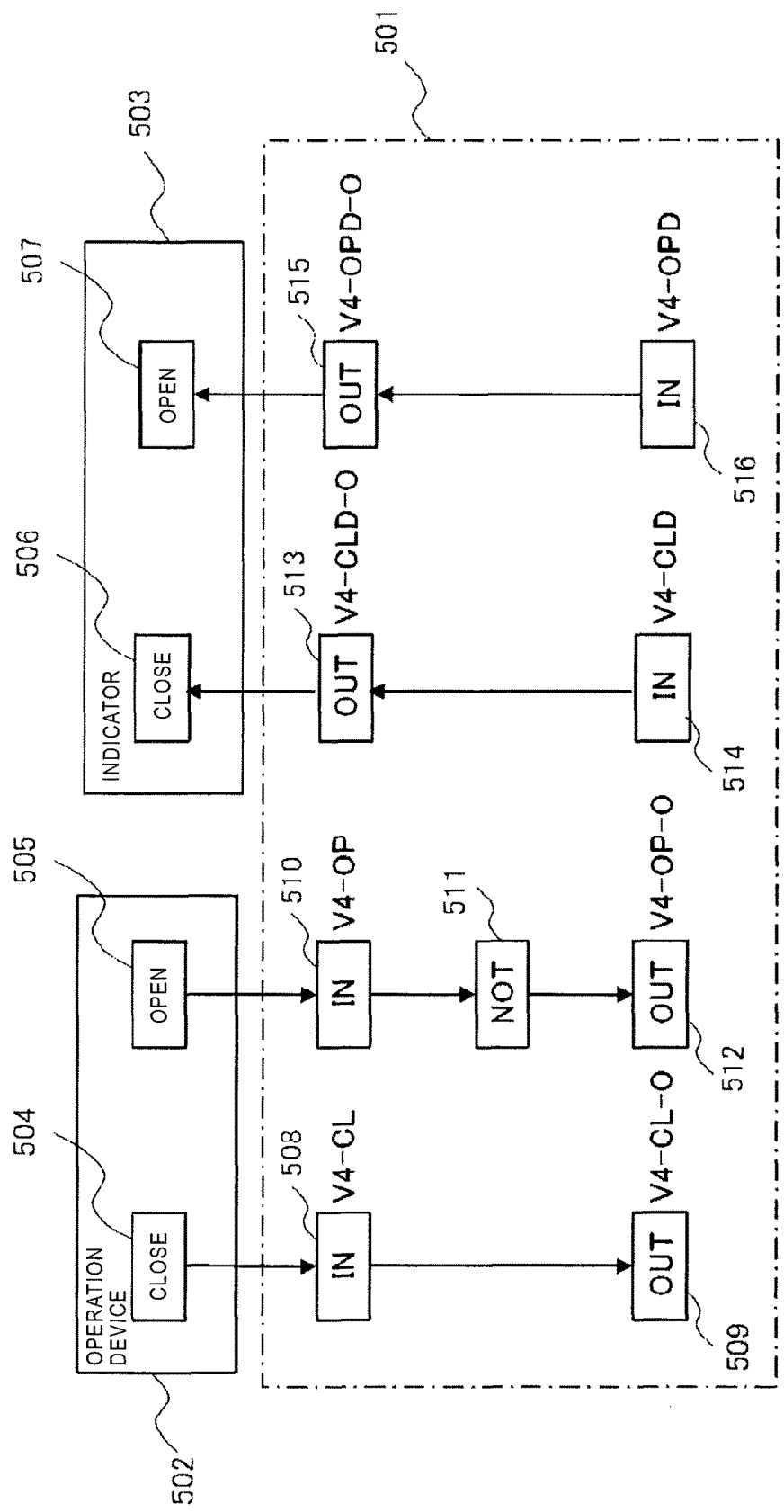
FIG. 5 shows one example of the control logic.

FIG. 3 and FIG. 5 each show one example of a control logic stored in the control logic storage unit 101. A control logic 301 is the control logic for an apparatus "V-001" whose apparatus type is "valve (TYPE-A)". A control logic 501 is the control logic for an apparatus "V-004" whose apparatus type is "valve (TYPE-B)". Each control logic is a logic for performing monitoring control of an apparatus, and in the present embodiment, includes: arithmetic elements which perform various types of calculations on signals; and signal lines which connect the arithmetic elements to each other and which show the flows of the signals.

Figure 4:
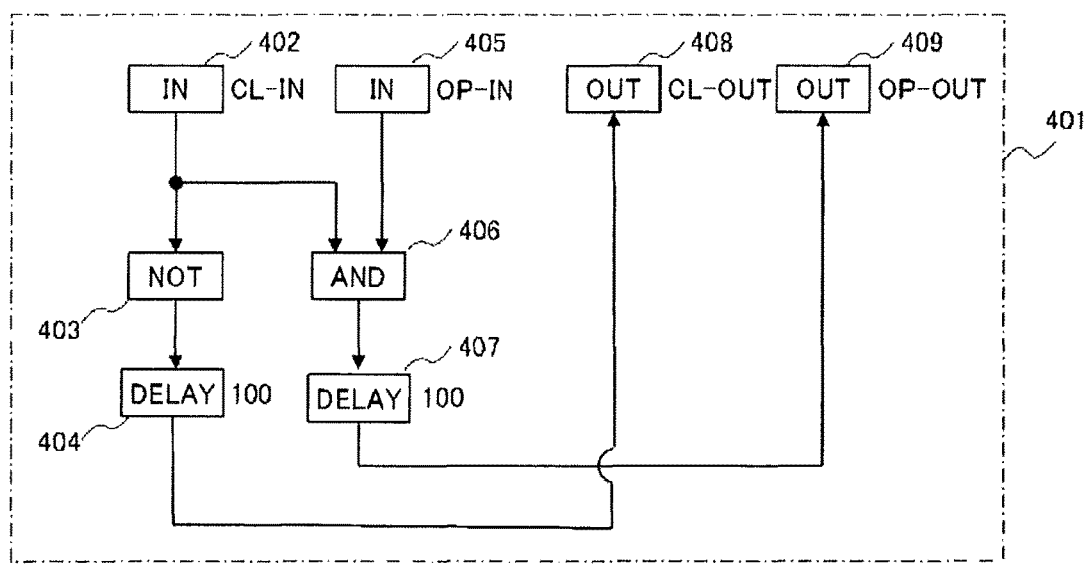
FIG. 4 is shows one example of a simulation logic.
Figure 6:
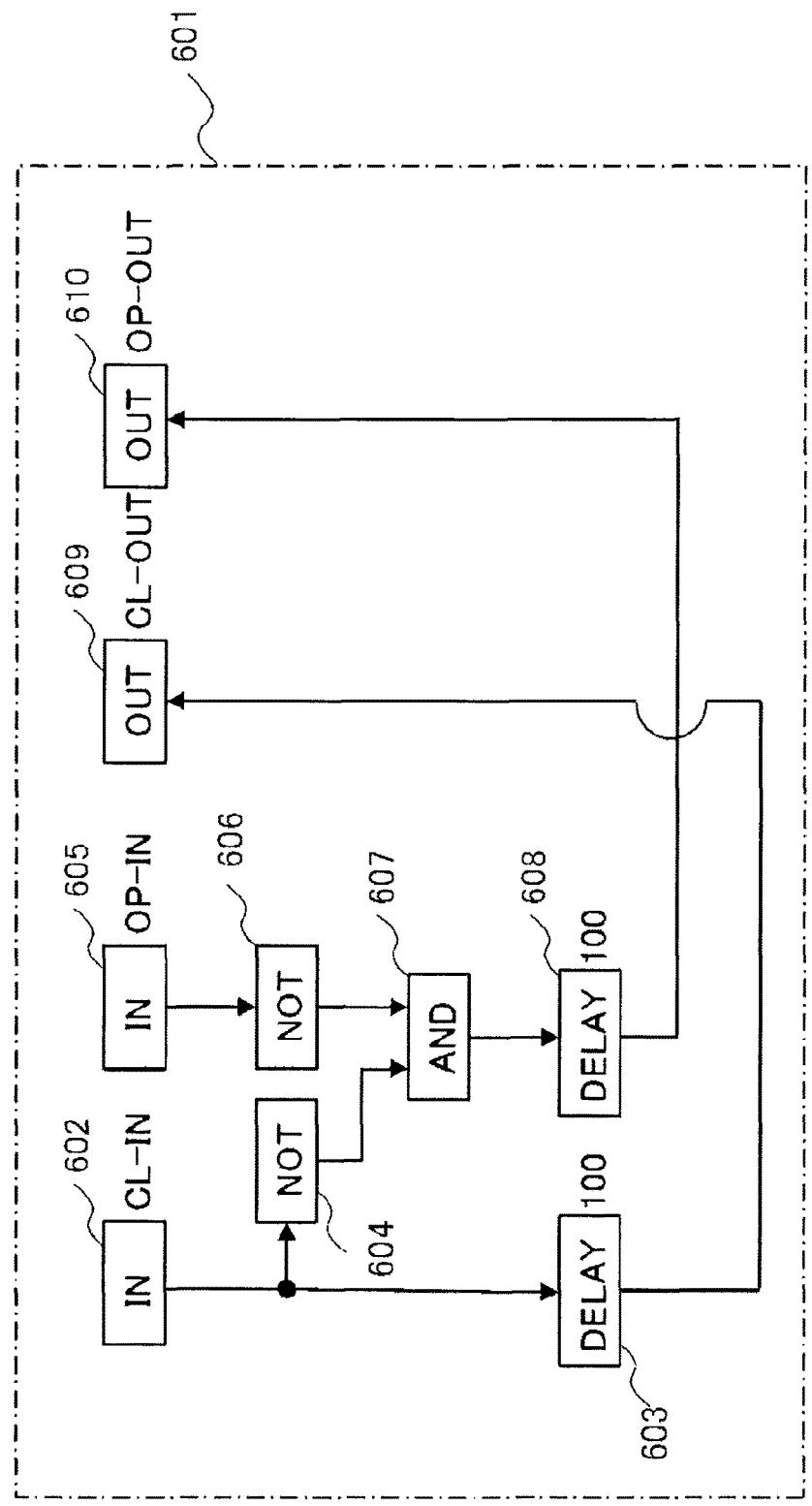
FIG. 6 shows one example of the simulation logic.

FIG. 4 and FIG. 6 each show one example of a simulation logic stored in a simulation logic storage unit 116 of the simulation logic supplying unit 102. A simulation logic 401 is a simulation logic "logic C1" for the apparatus "V-001" whose apparatus type is "valve (TYPE-A)". A simulation logic 601 is a simulation logic "logic C2" for the apparatus "V-004" whose apparatus type is "valve (TYPE-B)". Each simulation logic is a logic for simulating operation of an apparatus such as a valve, and in the present embodiment, as with the control logic, includes: arithmetic elements which perform various types of calculation on signals; and signal lines which connect the arithmetic elements to each other and which show the flows of the signals.

FIG. 7 shows description rules and explanations of arithmetic elements and a signal line included in control logics and simulation logics. FIG. 7 shows only some of the types of the arithmetic elements and the signal lines. Various arithmetic elements other than these are also included in the control logics and the simulation logics. The control logics 301 and 501, and the simulation logics 401 and 601 include a plurality of arithmetic elements (input operator, output operator, AND operator, OR operator, NOT operator, flip-flop, On delay); and signal lines (digital lines represented by solid lines) connecting these arithmetic elements.

FIG. 8 and FIG. 9 each show one example of logic connection information that is used by the logic connecting unit 105 and that is for connecting the input/output operators of a control logic and the input/output operators of a simulation logic. Logic connection information 801 is the logic connection information for the apparatus "V-001", and logic connection information 901 is the logic connection information for the apparatus "V-004".

FIG. 10 shows one example of the simulation logic management rule stored in the simulation logic management rule storage unit 108. Simulation logics to be used for respective apparatus types are described therein.

Figures 11, 12:
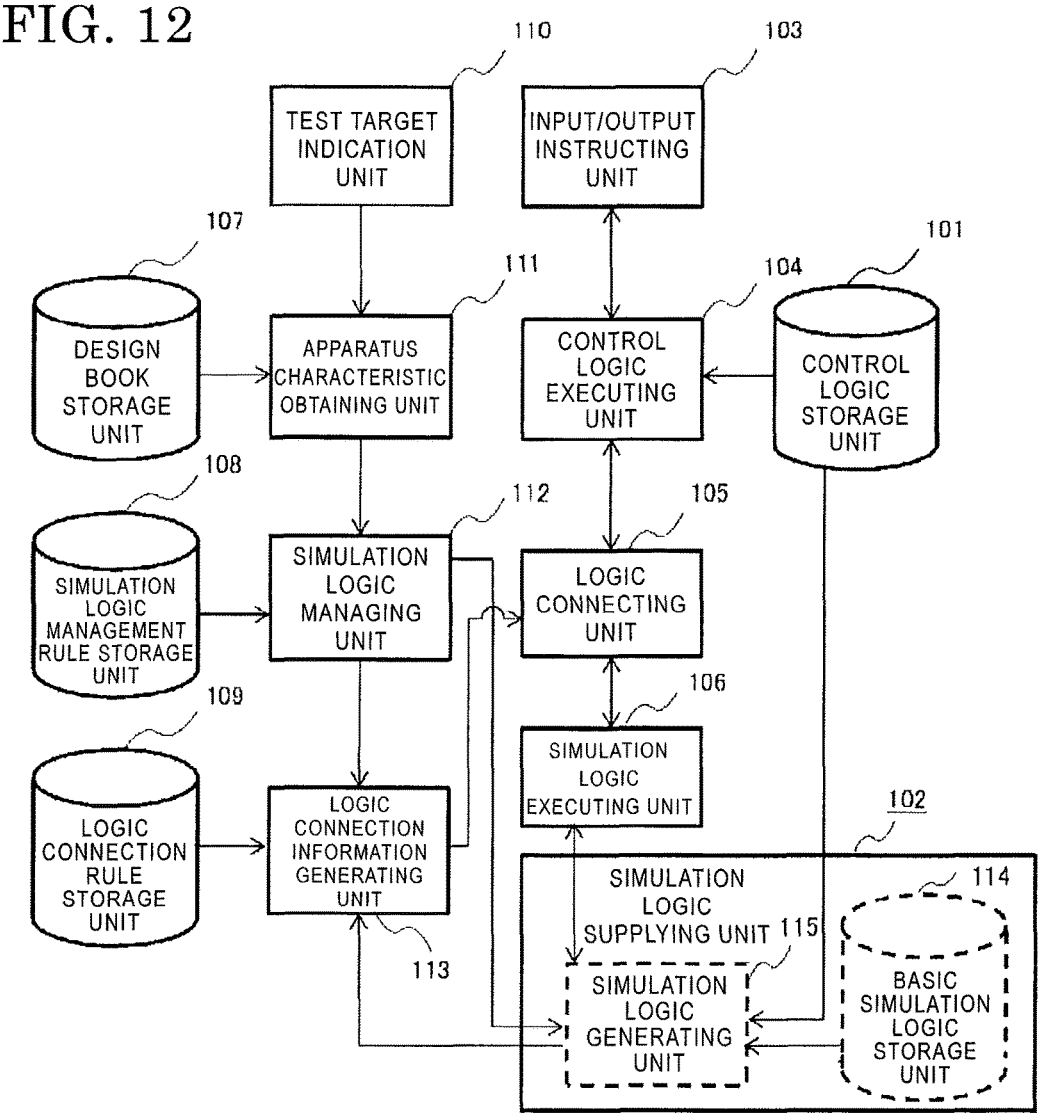
FIG. 11 shows one example of a logic connection rule.
FIG. 12 is a block diagram showing a configuration of a test device for a monitoring control device according to embodiment 2.

FIG. 11 shows one example of a logic connection rule stored in the logic connection rule storage unit 109. A logic connection rule 1101 is the logic connection rule for valves.

Next, with reference to FIG. 1, operation will be described. The following description is on the assumption that the apparatus "V-001" and the apparatus "V-004" are inputted as the test target, to the test target indication unit 110.

The apparatus characteristic obtaining unit 111 obtains, from the design book storage unit 107, the system diagram 201 including the apparatus "V-001" and the apparatus "V-004", and obtains apparatus characteristics of the apparatus "V-001" and the apparatus "V-004". Here, the apparatus characteristic indicates the characteristic of each apparatus, and means, for example, the apparatus name, the apparatus type, the apparatus model, the apparatus manufacturer, the type of the apparatus controller, or the like. Specifically, from the system diagram 201, the apparatus characteristic obtaining unit 111 obtains the fact that the apparatus type of the apparatus "V-001" is "valve (TYPE-A)" and the apparatus type of the apparatus "V-004" is "valve (TYPE-B)".

The simulation logic managing unit 112 specifies a simulation logic for each apparatus on the basis of the simulation logic management rule stored in the simulation logic management rule storage unit 108. Specifically, on the basis of a simulation logic management rule 1001, since the apparatus type of the apparatus "V-001" is "valve (TYPE-A)", the fact that the corresponding simulation logic is "logic C1" 401 is obtained. Similarly, since the apparatus type of the apparatus "V-004" is "valve (TYPE-B)", the fact that the corresponding simulation logic is "logic C2" 601 is obtained.

The logic connection information generating unit 113 generates logic connection information on the basis of a logic connection rule stored in the logic connection rule storage unit 109. "[0-9]" indicated in the logic connection rule 1101 for valves means a number from 0 to 9, and the signal name of the simulation logic to be connected is specified from the signal name of the input/output operator included in the control logic. On the basis of the logic connection rule 1101, for the apparatus "V-001", the logic connection information 801 is generated such that "V1-CL-O" is connected to "CL-IN", "V1-OP-O" is connected to "OP-IN", "V1-CLD" is connected to "CL-OUT", and "V1-OPD" is connected to "OP-OUT". Similarly, for the apparatus "V-004", the logic connection information 901 is generated such that "V4-CL-O" is connected to "CL-IN", "V4-OP-O" is connected to "OP-IN", "V4-CLD" is connected to "CL-OUT", and "V4-OPD" is connected to "OP-OUT".

In the description above, "CL" in "CL-O" means "close", "O" means "out", "OP" means "open", "CLD" means "for close indication" and "OPD" means "for open indication" (the same also applies to the description below).

According to the test device for a monitoring control device of the present embodiment as described above, on the basis of the simulation logic management rule, a simulation logic appropriate for a control logic is specified from the apparatus characteristic obtained from the design book, and on the basis of the logic connection rule, the control logic and the simulation logic are connected to each other. Therefore, without generation or preparation of logic connection information for each apparatus, a simulation logic and a control logic can be automatically connected to each other, and thus, time and effort for that work can be saved.

In the description above, a case has been described in which the test device for a monitoring control device according to the present embodiment specifies simulation logics for the apparatus "V-001" and the apparatus "V-004" and performs operation of connecting control logics and their corresponding simulation logics to each other. However, also for other apparatuses, simulation logics can be specified and connected through similar operation.

In the present embodiment, a very simple connection between a control logic and a simulation logic as shown in FIG. 3 and FIG. 4 has been described. However, the present invention is not limited to such a simple case. For example, in a case of large-scale operation of a monitoring control system, behavior is difficult to be described in one sheet of a logic diagram, and is often expressed in a plurality of diagrams. Also in such a case, similar operation can be performed.

The control logic and the simulation logic have been described as being in the form of a function block diagram composed of: arithmetic elements which perform various types of calculations on signals; and signal lines connecting arithmetic elements to each other and showing the flows of the signals. However, the present invention is not limited to the logic description method. Also in a case where logic is described in another language, such as Ladder Logic or Instruction List, for example, similar operation can be performed.

In the present embodiment, description has been made, assuming that the apparatus characteristic is the apparatus type obtained from the system diagram. However, the apparatus characteristic may be, for example, the apparatus model, the type of the apparatus controller, or the like other than the apparatus type. In addition, by using a plurality of apparatus, characteristics in combination, it becomes possible to specify a simulation logic even when there are many types of simulation logics. In a case where the apparatus characteristic needs to be obtained from a book other than the system diagram, if the apparatus characteristic obtaining unit 111 for analyzing a corresponding design book is used, operation similar to that described above can be performed.

Embodiment 2

FIG. 12 is a block diagram showing a configuration of a test device for a monitoring control device according to embodiment 2 of the present invention. In the test device for a monitoring control device according to the present embodiment, components that are the same as or similar to components described in embodiment 1 are denoted by the same reference characters, and differences are mainly described.

In FIG. 12, the test device for a monitoring control device according to the present embodiment 2 is composed of components (the control logic storage unit 101 to a simulation logic generating unit 115) described below. The simulation logic supplying unit 102 of the test device for a monitoring control device according to the present embodiment is the simulation logic supplying unit 102, of the test device for a monitoring control device according to embodiment 1, which includes a basic simulation logic storage unit 114 and the simulation logic generating unit 115.

The operation up to when the apparatus characteristic obtaining unit 111 obtains the apparatus characteristic and outputs the apparatus characteristic to the simulation logic managing unit 112 is the same as that in embodiment 1. The simulation logic managing unit 112 receives the apparatus characteristic of each apparatus from the apparatus characteristic Obtaining unit 111, specifies a basic simulation logic corresponding to each apparatus on the basis of the simulation logic management rule stored in the simulation logic management rule storage unit 108, and outputs the result to the logic connection information generating unit 113 and the simulation logic generating unit 115. The simulation logic generating unit 115 obtains the basic simulation logic from the basic simulation logic storage unit 114, generates a simulation logic for the target apparatus from the obtained basic simulation logic, and outputs the generated simulation logic to the logic connection information generating unit 113 and the simulation logic executing unit 106. The operation thereafter is the same as that in embodiment 1.

Figures 13, 14:
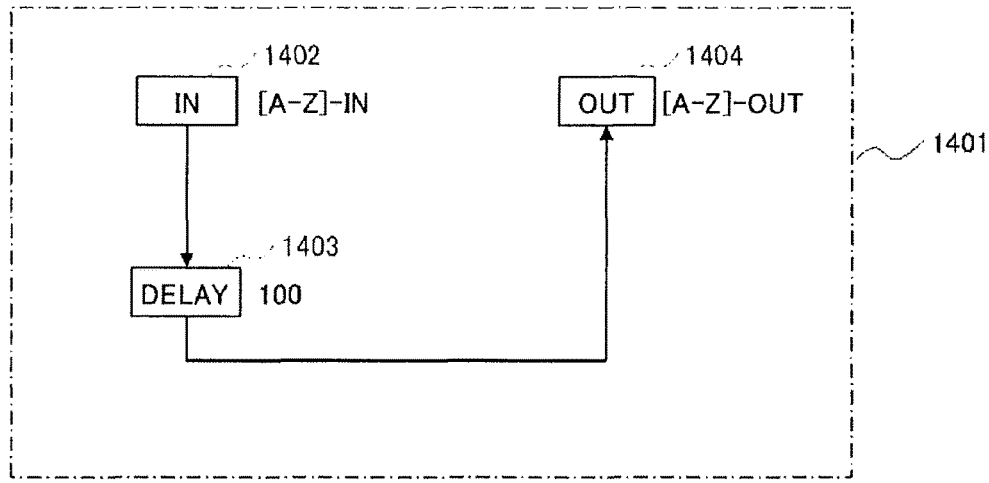
FIG. 13 shows one example of an apparatus list.
FIG. 14 shows one example of a basic simulation logic.

FIG. 13 shows one example of an apparatus list 1301 as the design book stored in the design book storage unit 107.

That is, the design book according to the present embodiment includes the apparatus list 1301 describing the specifications of the apparatuses that are to be the target of the monitoring control by the monitoring control system. In the example shown in FIG. 13, described are specifications of a tank, three pumps, five valves, and two apparatuses X which correspond to the apparatuses as the target of the monitoring control by the monitoring control system. To each apparatus, an apparatus name, an apparatus type, a manufacturer, and an apparatus model are assigned. The apparatus models "D-001" and "D-002" of the apparatus type "apparatus X" indicate that the apparatuses X are of different models, and the numbers of states of the apparatuses are different.

Figure 16:
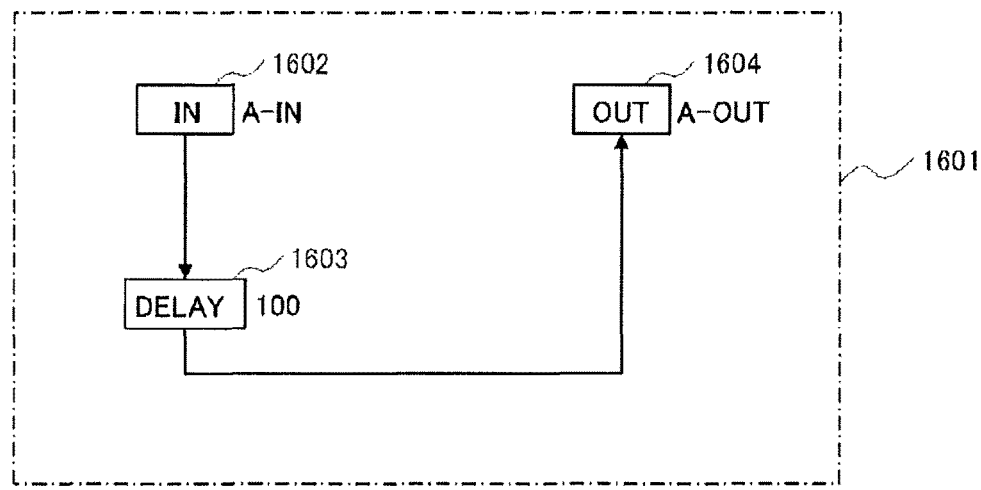
FIG. 16 shows one example of a simulation logic.
Figure 18:
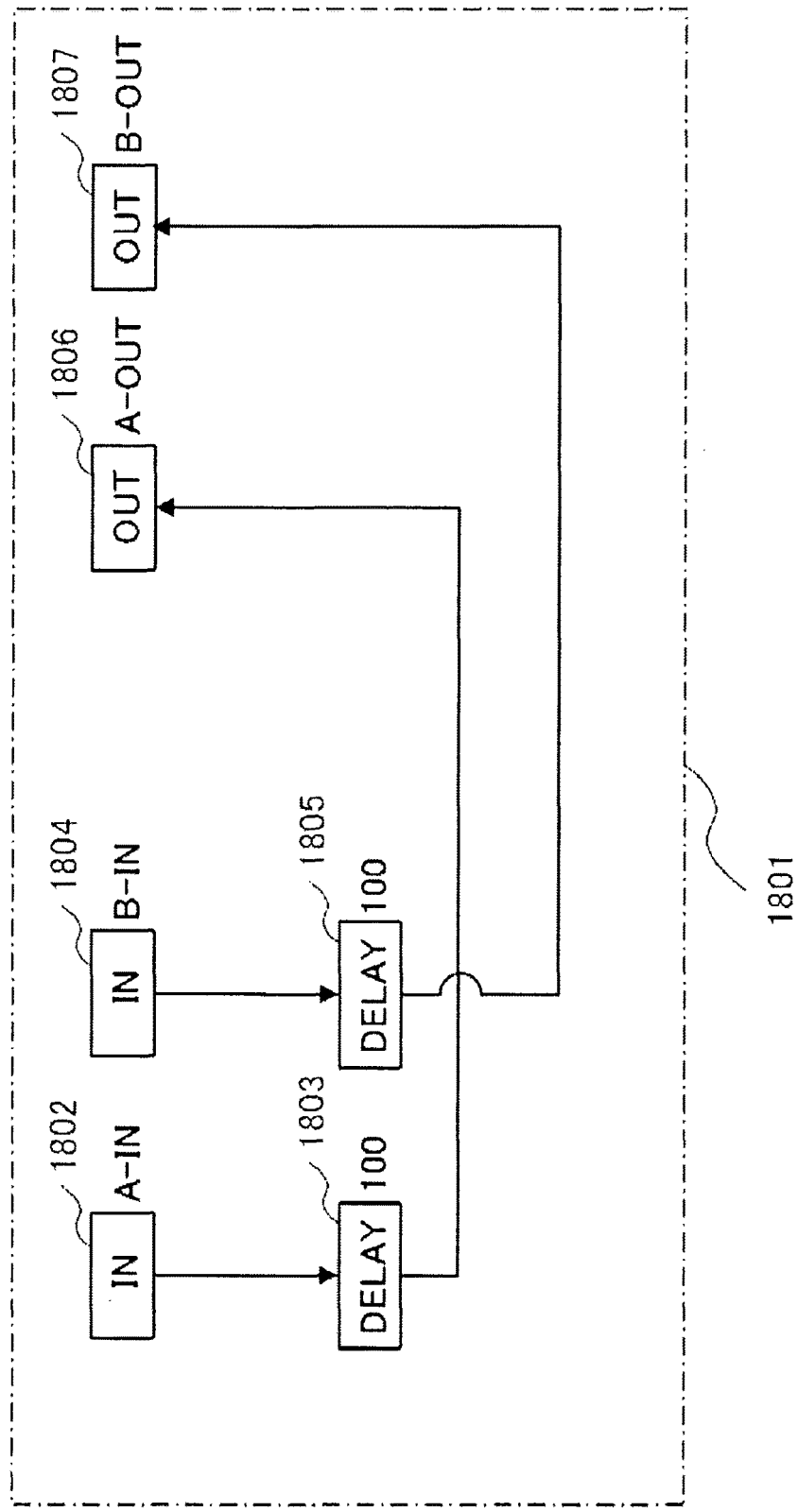
FIG. 18 shows one example of the simulation logic.

FIG. 14 shows one example of a basic simulation logic stored in the basic simulation logic storage unit 114. In the present embodiment, as with the simulation logic, the basic simulation logic includes: arithmetic elements which perform various types of calculations on signals; and signal lines which connect arithmetic elements to each other and which show the flows of the signals. The basic simulation logic is a logic serving as a basic pattern for a simulation logic, and the simulation logic is composed of one type of basic simulation logic or composed of a combination of a plurality of types of basic simulation logics (specifically, in the example shown, the simulation logic for M-001 shown in FIG. 16 is composed of a single basic simulation logic of one type shown in FIG. 14, and the simulation logic for M-002 shown in FIG. 18 is composed of two basic simulation logics of one type shown in FIG. 14). A basic simulation logic 1401 is a simulation logic "logic D" for the apparatus type "apparatus X" . "[A-Z]" indicated in the signal name of the basic simulation logic 1401 means an alphabet from A to Z.

Figure 15:
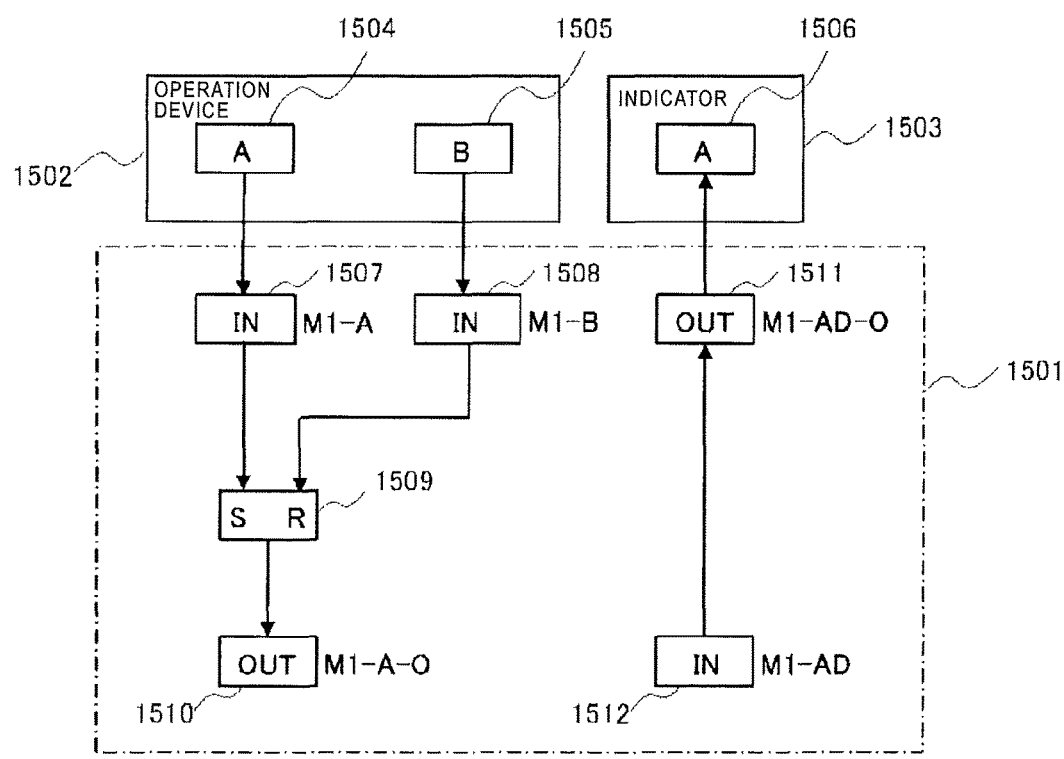
FIG. 15 shows one example of a control logic.
Figure 17:
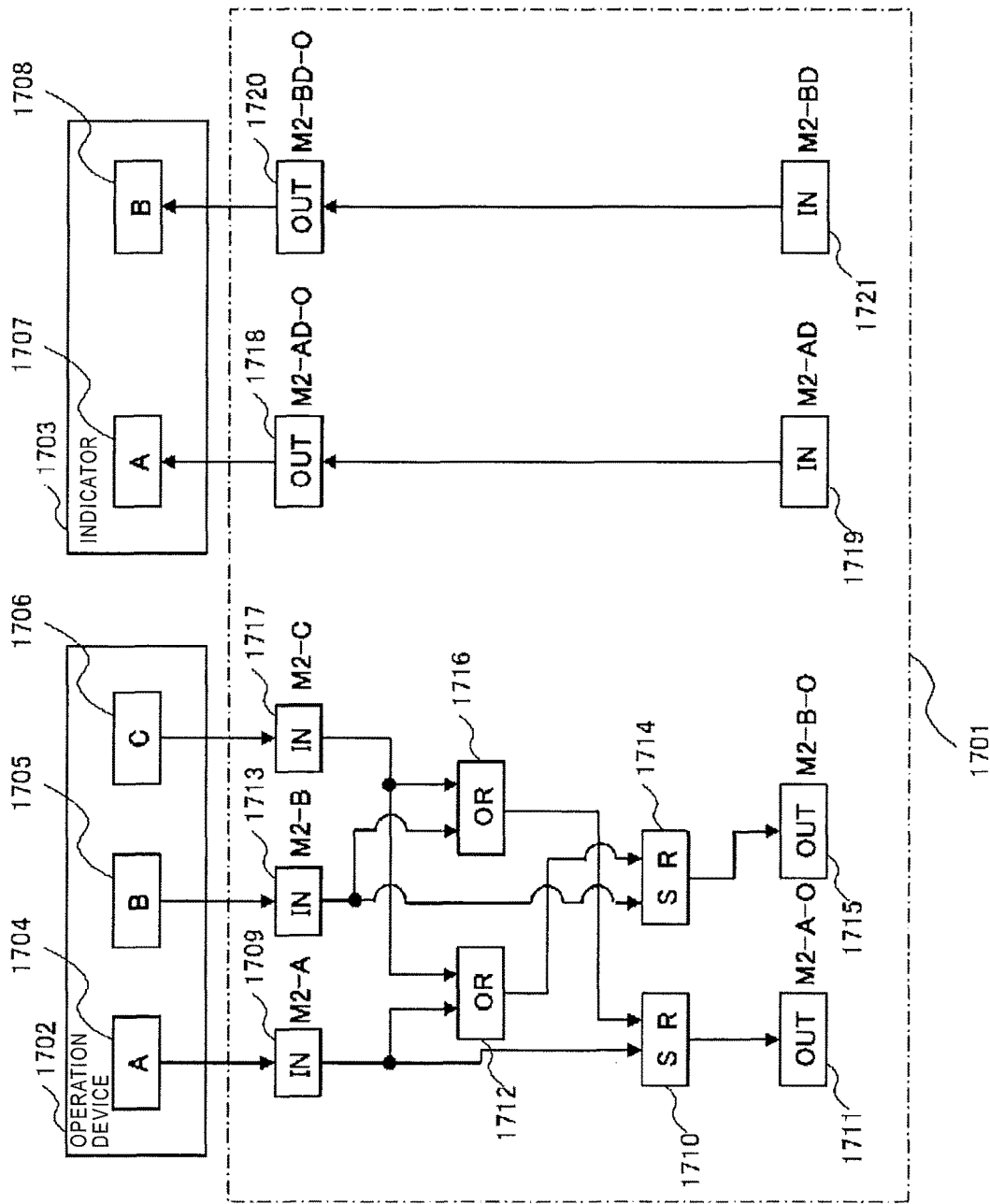
FIG. 17 shows one example of the control logic.

FIG. 15 and FIG. 17 each show one example of a control logic stored in the control logic storage unit 101. A control logic 1501 is the control logic for the apparatus "M-001" whose apparatus model is "D-001" and which controls two states of "A" and "B". A control logic 1701 is the control logic for the apparatus "M-002" whose apparatus model is "D-002" and which controls three states of "A", "B", and "C".

FIG. 16 and FIG. 18 each show one example of a simulation logic generated by the simulation logic generating unit 115. A simulation logic 1601 is the simulation logic for the apparatus "M-001", and a simulation logic 1801 is the simulation logic for the apparatus "M-002".

FIG. 19 shows one example of the simulation logic management rule stored in. the simulation. logic management rule storage unit 108. Basic simulation logics to be used for respective apparatus types are described therein.

FIG. 20 shows one example of a logic connection rule stored in the logic connection rule storage unit 109. A logic connection rule 2001 is the logic connection rule for the apparatus X.

FIG. 21 and FIG. 22 each show one example of logic connection information that is used by the logic connecting unit 105 and that is for connecting the input/output operators of a control logic and the input/output operators of a simulation logic. Logic connection information 2101 is the logic connection information of the apparatus "M-001", and logic connection information 2201 is the logic connection information for the apparatus "M-002".

Next, operation will be described. The following description is on the assumption that the apparatus "M-001" and the apparatus "M-002" are inputted as the test target, to the test target indication unit 110.

The apparatus characteristic obtaining unit 111 obtains, from the design book storage unit 107, the apparatus list 1301 including the apparatus "M-001" and the apparatus "M-002", and obtains apparatus characteristics of the apparatus "M-001" and the apparatus "M-002". Specifically, the fact that the apparatus type of the apparatus "M-001" and the apparatus "M-002" is "apparatus X" is obtained from, the apparatus list 1301.

The simulation logic managing unit 112 specifies a basic simulation logic for each apparatus on the basis of the simulation logic management rule stored in the simulation logic management rule storage unit 108. Specifically, on the basis of a simulation logic management rule 1901, since the apparatus type of the apparatus "M-001" and the apparatus "M-002" is "apparatus X", the fact that the basic simulation logic is "logic D" 1401 is obtained.

Since the input/output operators of the control logic 1501 for the apparatus "M-001" are output operator "M1-A-O" and input operator "M1-AD", the simulation logic generating unit 115 generates the simulation logic 1601 obtained by changing, in the basic simulation logic 1401, the signal names from "[A-Z]-IN" to "A-IN" and from "[A-Z]-OUT" to "A-OUT". Further, since the input/output operators of the control logic 1701 for the apparatus "M-002" are output operators "M2-A-O" and "M2-B-O", and the input operators "M2-AD" and "M2-BD", the simulation logic generating unit 115 duplicates the logic of the basic simulation logic 1401 thereby generating two of the logics, and generates the simulation logic 1801 obtained by changing the signal names from "[A-Z]-IN" to "A-IN", from "[A-Z]-OUT" to "A-OUT", from "[A-Z]-IN" to "B-IN", and from "[A-Z]-OUT" to "B-OUT".

The logic connection information generating unit 113 generates logic connection information on the basis of a logic connection rule stored in the logic connection rule storage unit 109. "[0-9]" indicated in the logic connection rule 2001 means a number from 0 to 9 and "[A-Z]" indicated therein means an alphabet from A to Z. From the signal name of the input/output operator included in the control logic, the signal name of the simulation logic to be connected is determined. On the basis of the logic connection rule 2001, the logic connection information 2101 for the apparatus "M-001" and the logic connection information 2201 for the apparatus "M-002" are generated.

According to the test device for a monitoring control device of the present embodiment as described above, a simulation logic is generated from a basic simulation logic, and the generated simulation, logic and a control logic are connected to each other. Therefore, without generation or preparation of a simulation logic for each apparatus, a simulation logic can be automatically generated from the basic simulation logic, and thus, time and effort for that work can be saved.

In the description above, operation has been described in which a simulation logic to be used in the test device for a monitoring control device according to the present embodiment is generated from one type of basic simulation logic. However, also in a case where the simulation logic is generated using a combination of a plurality of types of basic simulation logics (for example, a case where, in the basic simulation logic shown in FIG. 14, two; types of basic simulation logics respectively having "DELAY" 100 and "DELAY" 10 are combined), a simulation logic can be automatically generated by preparing a corresponding simulation logic management rule.

It is noted that, within the scope of the present invention, the above embodiments may be freely combined with each other, or each of the above embodiments may be modified or simplified as appropriate.

DESCRIPTION OF THE REFERENCE CHARACTERS 101 control logic storage unit
102 simulation logic supplying unit
103 input/output instructing unit
104 control logic executing unit
105 logic connecting unit
106 simulation logic executing unit
107 design book storage unit
108 simulation logic management rule storage unit
109 logic connection rule storage unit
110 test target indication unit
111 apparatus characteristic obtaining unit
112 simulation logic managing unit
113 logic connection information generating unit
114 basic simulation logic storage unit
115 simulation logic generating unit
116 simulation logic storage unit

The invention claimed is:

1. A test device for a monitoring control device for an apparatus that is to be a control target of a monitoring control system, the test device comprising:
a control logic storage unit in which to store a control logic which is a logic for controlling the apparatus;
a logic controller which executes the control logic retrieved from the control logic storage unit;
an input/output controller which instructs the logic controller to perform: an input operation of retrieving the control logic from the control logic storage unit and inputting the control logic to the logic controller; and an output operation of outputting a result of execution in the logic controller;
a logic supplying simulator which supplies a simulation logic which is a logic for simulating operation of the apparatus;
a logic executing simulator which retrieves the simulation logic from the logic supplying simulator and executes the simulation logic;
a logic connector which connects the control logic and the simulation logic to each other;
a test target indication unit to which an apparatus that is to be a control target of a control logic as a test target is indicated;
a design book storage unit in which to store a design book, the design book being a book based on which the apparatus is used for designing the monitoring control system;
an apparatus characteristic receiver which obtains, from the design book storage unit, an apparatus characteristic of the apparatus that has been indicated to the test target indication unit and that is to be the control target of the control logic as the test target;
a logic managing simulator which specifies, on the basis of a simulation logic management rule describing relationship between the apparatus characteristic and the simulation logic, a simulation logic appropriate for the control logic as the test target; and
a logic connection information generator which generates, on the basis of a logic connection rule describing a method for connecting the control logic and the simulation logic to each other, logic connection information for connecting the control logic as the test target and the simulation logic specified by the logic managing simulator to each other, wherein
the logic connector connects the control logic as the test target and the simulation logic as the control target to each other, by using the logic connection information generated by the logic connection information generator.

2. The test device for a monitoring control device according to claim 1, wherein
the logic supplying simulator includes: a simulation logic storage unit in which to store the simulation logic; or a basic simulation logic storage unit in which to store a basic simulation logic which is a basic pattern for the simulation logic, and a simulation logic generating unit for generating the simulation logic from the basic simulation logic.

3. The test device for a monitoring control device according to claim 1, wherein
the control logic storage unit and the logic supplying simulator each include nodes for processing signals in each of modules constituting the monitoring control system, and links connecting the nodes to each other and showing flows of the signals.

4. The test device for a monitoring control device according to claim 1, wherein
the design book
has a system diagram showing a system of the apparatus that is to be the control target of the monitoring control system, or an apparatus specification describing a specification of the apparatus that is to be the control target, and
includes, as information of the apparatus characteristic of the apparatus, at least one of name, type, model, and manufacturer, of the apparatus, and type of a controller for controlling the apparatus.

* * * * *